United States Patent [19]

DeWoody

[11] Patent Number: 5,073,348

[45] Date of Patent: Dec. 17, 1991

[54] LIQUID ADDITION FUNNEL FOR PRESSURE REACTORS

[75] Inventor: Charles M. DeWoody, Vineland, N.J.

[73] Assignee: Ace Glass Incorporated, Vineland, N.J.

[21] Appl. No.: 549,666

[22] Filed: Jul. 9, 1990

Related U.S. Application Data

[63] Continuation of Ser. No. 160,152, Feb. 25, 1988, abandoned.

[51] Int. Cl.$^5$ .................. B01L 11/00; B65D 47/18
[52] U.S. Cl. .................................. 422/101; 222/422
[58] Field of Search .................. 422/101; 222/422; 285/223

[56] References Cited

U.S. PATENT DOCUMENTS

| 3,107,205 | 10/1963 | Moran et al. | 422/101 |
| 3,370,761 | 2/1968 | Kontes et al. | 222/422 |
| 3,695,642 | 10/1972 | DeWoody | 285/223 |
| 4,255,386 | 3/1981 | Schachter et al. | 422/101 |

FOREIGN PATENT DOCUMENTS 3614556  11/1987  Fed. Rep. of Germany ...... 422/101

Primary Examiner—Robert J. Warden
Assistant Examiner—Lyle A. Alexander
Attorney, Agent, or Firm—Lowe, Price, LeBlanc & Becker

[57] ABSTRACT

A pressure equalizing liquid addition funnel for a closed system reactor is described. The funnel includes an internal valve stem which seats in the outlet port and extends therethrough and which defines a lumen which extends axially from below the outlet port upwardly to a port in the valve stem in the upper portion of said flask. The valve stem then terminates in a valve cap which is threadedly mounted on the funnel whereby rotation of the cap will cause the valve to engage or disengage a valve seat at the outlet.

8 Claims, 1 Drawing Sheet

LIQUID ADDITION FUNNEL FOR PRESSURE REACTORS

This application is a continuation of application Ser. No. 07/160,152, filed Feb. 25, 1988, now abandoned.

BACKGROUND OF THE INVENTION

This invention relates to a liquid addition funnel for reaction vessels having internal pressures different from atmospheric and in particular to a pressure equalizing funnel whereby the pressure above the liquid to be added is the same as that within the reactor.

Chemical laboratories often preform reactions under a variety of conditions which include temperatures and pressures different from ambient. Such reactions then are preformed in closed systems whereby temperature and pressure are interdependent or where pressure alone is a major variable. Pressures exceeding 100 psig are not uncommon.

In such systems the addition of liquid reagents becomes a problem. In the past small expensive high pressure pumps have been used extensively for the introduction of reagents. Flow is controlled by varying the speed or stroke of the unit. Such pumps however do not respond to pressure changes within the vessel and are difficult to regulate when small quantities are involved. The backstroke is the same slow speed as the forward stroke and anti-suck-back valves do not close fast enough or are prone to remain shut, causing erratic flow. There are also presently available liquid addition funnels with external, pressure equalizing tubes which place the interior of the reaction vessel in communication with the interior of the funnel above the liquid to be added. In U.S. Pat. No. 3,370,761 such a vessel is described. While such exterior arms do equalize pressure so that the pressure above the liquid to be added is the same as that in the pressure vessel, such external tubes create a safety hazard when made of glass because of their fragility.

It should be noted that in that patent that a valve stem regulated by rotating a threaded member is used to open or close the outlet to the funnel. In other nonpatented prior art devices having pressure equalizing external tubes a stopcock is used instead of a valve stem. The stopcock however is subject to squirting o "suck-back" which is undesirable.

With the advent of glass threads, connectors, plugs and the like can be provided for glass reaction vessels which permit operation at elevated pressures up to the bursting point of the vessels. See for example U.S. Pat. No. 3,695,642 which describes a variety of connectors, plugs and the like wherein the glass female member has internal threads and preferably a male member is provided with external threads. The male member normally is constructed of polylterafluoroethylene (hereinafter Teflon). Such vessels then can maintain internal integrity at pressures up to and above 200 psig, and in the case of borosilicate glass up to the allowable tensile stress of 1000 psi. According to the disclosure of U.S. Pat. No. 3,695,642 is hereby incorporated by reference.

SUMMARY OF THE INVENTION

It has been discovered however that the aforementioned problems especially with a side arm tube for pressure equalization can be solved by eliminating the side arm and using a valve stem having a lumen therein whereby communication is established between the pressure vessel and the area within the addition flask of this invention above the liquid to the added. The valve stem is provided with a frusto conical valve portion which usually mounts an O-ring, and is adapted to seat in a tapered portion at the outlet of the flask. The valve stem then extends through the seat and terminates in a tube which extends downwardly into the reaction vessel. The tube is merely an extension of the lumen. The upper portion of the valve is mounted on a threaded stopper which is received in an internally threaded vessel neck. Rotation of the stopper then causes the valve stem to seat or unseat. When the valve is unseated, the liquid will flow through the outlet around the walls thereof and through an expanded portion whereby the liquid will enter the reaction vessel without contacting the valve stem tube.

Accordingly, it is an object of this invention to provide a liquid addition flask for a reactor vessel whereby the pressure above the liquid to be added will be the same as that within the reaction vessel.

It is another object of this invention to provide a pressure equalizing liquid addition funnel for a pressure reactor wherein the outlet is controlled by a valve stem which extends upwardly through the vessel to a cap threadedly received in a neck on the upper portion of the vessel disposed coaxially with the outlet whereby rotation of the cap will open or close the outlet.

It is yet another object of this invention to provide a glass liquid addition funnel for a pressure vessel which uses a valve stem having a lumen therethrough which in turn controls the flow of liquid through the outlet while providing a pressure equalizing through the lumen to that the pressure above the liquid is the same as the pressure within the vessel, said vessel capable of internal pressures up to the allowable tensile stress for the glass material.

BRIEF DESCRIPTION OF THE DRAWINGS

These and other object will become readily apparent with reference to the drawings and following description wherein.

DETAILED DESCRIPTION OF THE INVENTION

Figure 1:
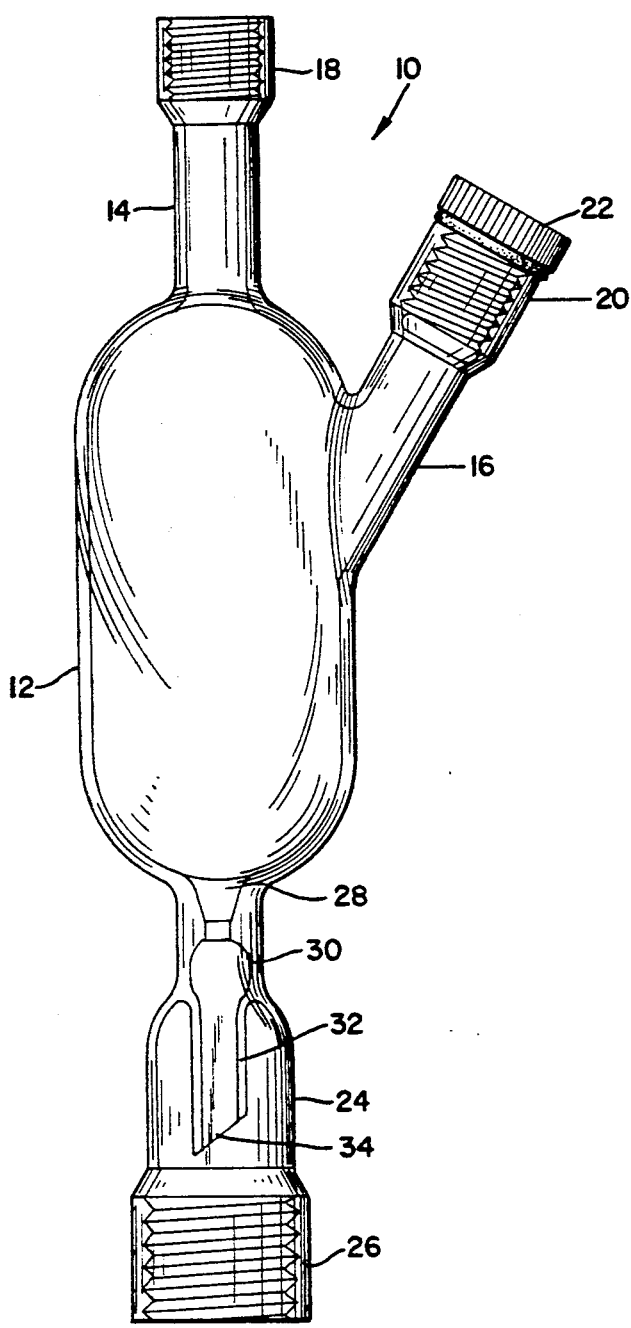
FIG. 1 is a side view of an embodiment of the vessel of this invention with the valve stem removed.

With reference to the drawings, the vessel of this invention is preferably constructed from borosilicate glass. The vessel includes a reservoir 12 and necks 14 and 16. Necks 14 and 16 are provided with flange portions 18 and 20 which are internally threaded as shown. Neck 16 may have a stopper member 22 or optionally may mount another reservoir (not shown) using for example the type of connection described in U.S. Pat. No. 3,695,642.

The lower portion of reservoir 12 mounts an outlet neck 24 with a flange portion 26 which is internally threaded as shown. Outlet 24 then is intended to be attached to a pressure vessel in a conventional fashion. The pressure vessel is not shown.

Figure 3:
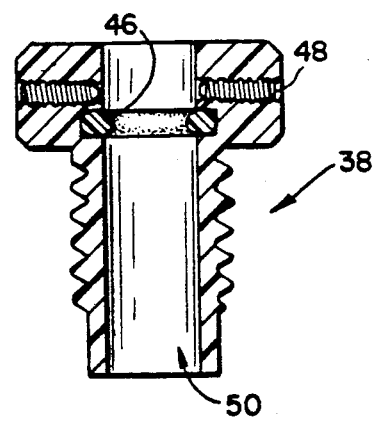
FIG. 3 is a cross sectional view of the valve stem cap shown in FIG. 2 with the valve stem removed.
Figure 2:
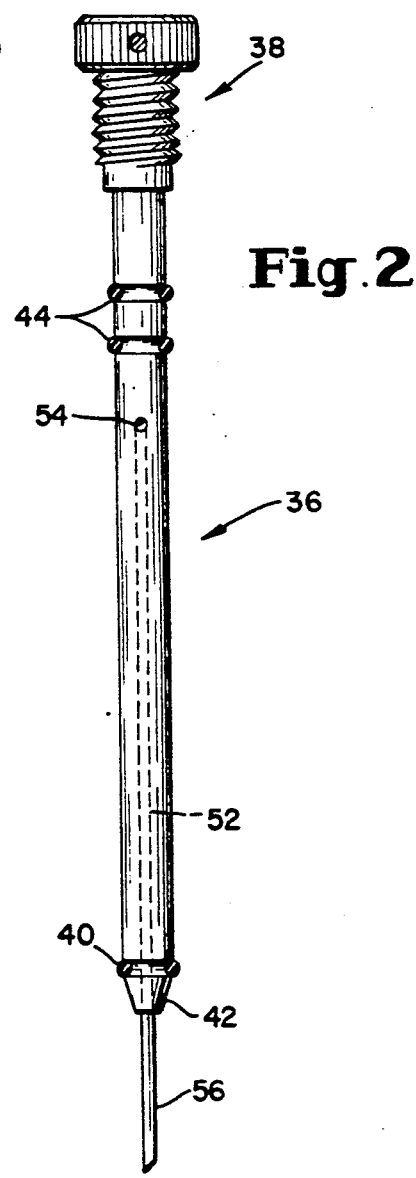
FIG. 2 is a side view of the valve stem of this invention.

Outlet 24 provides a tapered section 28 in communication with the interior of reservoir 12 at the bottom portion thereof. Tapered section 28 serves, as will be subsequently explained, as a valve seat. The outlet then extends through an expanded section 30 and finally a conduit 32 whereby liquid flowing from the reservoir will travel along the walls of tapered section 28, expanded section 30, and conduit 32 before it exits the port 34. With attention to FIGS. 2 and 3, a valve stem 36 is normally received in neck 14 and stopper 38 mounted thereon is intended to be received in the internal threads of flange portion 18. Stem 36 terminates in an O-ring seal 40 at the tapered end of 42. Seal 40 is intended to abut valve seat 28 and the vessel 10 and valve stem 36 are dimensioned accordingly. Preferably one or at least two O-rings 44 are provided in the upper portion of valve stem 36 which are intended to provide a dynamic seal in the interior of neck 14. With reference to FIG. 3, internal to stopper 38 is an O-ring 46, and set screws 48 may also be provided. The upper portion of valve stem 36 is solid and is then received within the interior passageway 50 in stopper 38 and secured therein by the set screws 48 and the O-ring seal 46.

A lumen 52 extends from the tapered end of 42 of valve stem 38 to a port 54 in the upper portion of stem 36. Lumen 52 terminates in hollow tube 56 which is dimensioned to extend through the tapered section 28 and into the expanded section 30. In the alternative tube 56 could be dimensioned to extend through the expanded section 30 into the conduit 32. The valve is opened and closed by rotating the stopper 38 within the threads in flange 18. The neck 14 and outlet 24 are coaxially disposed along the longitudinal axis of reservoir 12. Therefore as stopper 38 is rotated in the threads in flange 18, the O-ring seal will be translated vertically to either open or close the outlet by seating or unseating on the tapered portion 28. When the valve is open, liquid will flow from the interior reservoir 12 downwardly through the tapered section along the walls of expanded section 30 and conduit 32. This lengthened path eliminates squirting and "suck-back" which sometimes occurs with a stopcock plug orifice. In addition, by placing tube 56 within either expanded section 30 and/or conduit 32, the liquid will not feed back through the lumen 52 into the funnel.

As will be obvious to those skilled in the art, a separate tube 56 need not be used, the valve stem 36 could be similarly dimensioned. In addition, although a separate valve stem 36 and stopper 38 are shown, as will be obvious to those skilled in the art, they could be a unitary structure.

The valve stem is preferably constructed of "filled" Teflon which has a negligible cold flow, and yet is elastic and easily machined. The elasticity of the stem maintains a good seal even if there is misalignment, and by bending, limits the pressure which can be extended on the seat preventing the creating of excessive stress. Stoppers 38 and 22 are also preferably constructed of Teflon or any equivalent inert plastic material.

In operation then valve stem 36 is received within reservoir 12 through neck 14 and stopper 36 is threadedly received within flange 18 until the O-ring 40 seats in the tapered section 28 of the outlet, to close the valve. The liquid to be dispensed may be added through side arm 16 either before reservoir 12 is mounted on the reaction vessel (not shown) or a separate reservoir may be mounted within the threaded flange 20. Outlet 24 is then mounted in a conventional fashion on the reaction vessel. When it is desired to add the liquid within reservoir 12, stopper 38 is merely rotated to raise O-ring seal 40 from seating engagement with tapered section 28. Liquid then flows down the sides of the tapered section 28, expanded section 30 and conduit 32 exiting through port 34 and into the reaction vessel (not shown). During this process the pressure within the reaction vessel below tube 56 is equalized with the pressure above the liquid to be added within reservoir 12 via the communication passage of lumen 52 and port 54. When the O-ring seal 40 is raised to unseat the opening then the liquid flows by gravity. When the reservoir has dispensed the desired quantity of liquid reagent then the stopper 38 is rotated to seat to O-ring 40 in tapered section 28.

As will be obvious to those skilled in the art, the sides of reservoir 12 may be equipped with graduations to indicate the volume dispensed if desired.

The invention may be embodied in other specific forms without departing from the spirit or essential characteristics thereto. The present embodiments are therefore to be considered in all respects as illustrative and not restrictive, the scope of the invention being indicated by the appended claims rather than by foregoing description, and all changes which come within the meaning and range of equivalency of the claims are therefore intended to be embraced therein.

I claim:

1. A pressure equalizing liquid addition funnel for a closed system reaction vessel comprising:

a hollow funnel having an upper inlet port and a lower outlet port at the bottom thereof and a first outlet neck surrounding said outlet port and extending downwardly, said first neck adapted to be mounted on said reaction vessel with said outlet port in communication with the interior thereof, and a second neck surrounding said inlet port and disposed in the upper portion of said vessel, said first and second necks having a common longitudinal axis;

valve seat means disposed in said outlet port;

valve stem means extending axially from said second neck, through said funnel, through said seat means, and into said first neck, for engaging and disengaging said seat means to open and close said outlet, said stem means further comprising a rod having a passageway therein extending from the lower end of said rod upwardly, said passageway terminating at a port in the sidewall of said rod adjacent and below said second neck, said passageway defining a lumen extending from the interior of said first neck upwardly to the upper portion of said funnel adjacent said second neck whereby when said funnel is mounted on a reaction vessel inlet the pressure in said funnel will be equalized with that within said vessel by said passageway in said rod providing communication between said reaction vessel and said upper portion of said funnel;

valve control means mounted on said second neck and connected to said stem means for controlling the opening and closing of said outlet;

closure means at the inlet port for opening and closing said port.

2. The funnel of claim 1 wherein said closure means comprises a third neck surrounding the inlet port and defining internal threads and a plug threadedly received in said neck.

3. The funnel of claim 1 wherein the upper portion of said second neck defines internal threads and said control means includes a valve cap threadedly received within said neck and engaging said rod whereby rotation of said cap will axially displace said rod.

4. The funnel of claim 3 wherein said seat means comprises a downwardly tapering wall surrounding the outlet port.

5. The funnel of claim 4 wherein said first neck includes an interior conduit depending from said outlet port and having a portion thereof having a diameter greater than the minimum diameter of the tapered outlet port.

6. The funnel of claim 5 wherein said rod terminates distally to said cap in a tube the interior of which is in communication with said lumen, said tube extending into said conduit and at least into said portion having a diameter greater than the outlet port.

7. The funnel of claim 6 further comprising an O-ring mounted on the exterior surface of said rod and adapted to engage the tapered wall surrounding the outlet port.

8. The funnel of claim 7 wherein said rod is constructed of an inert flexible plastic material and said funnel is constructed of glass.

* * * * *